No. 712,594. Patented Nov. 4, 1902.
A. C. E. RATEAU & H. A. E. HARLÉ.
STUFFING BOX FOR TURBINES.
(Application filed Aug. 12, 1902.)
(No Model.)
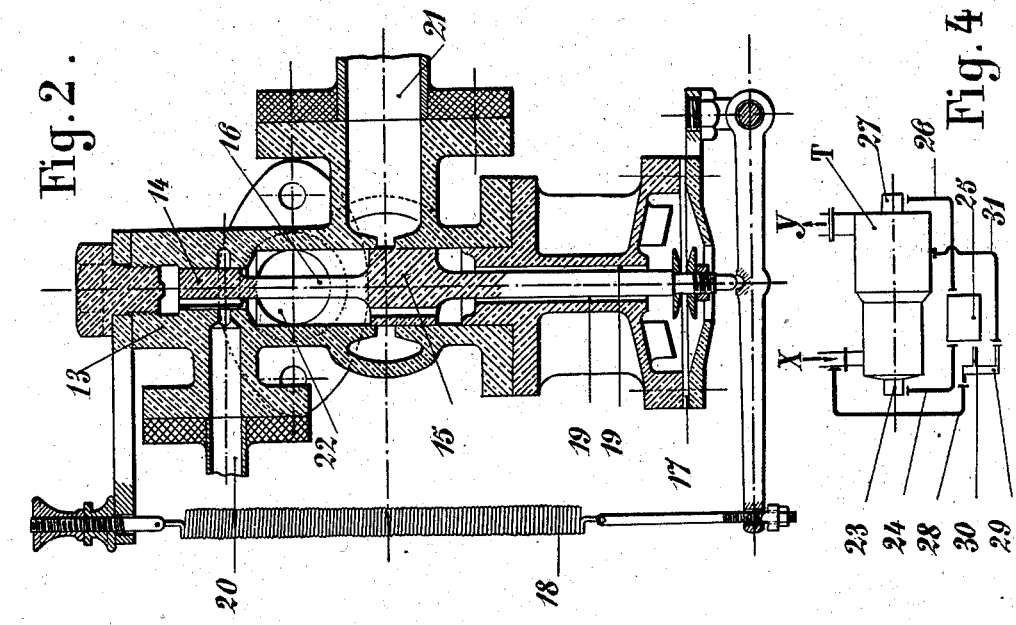
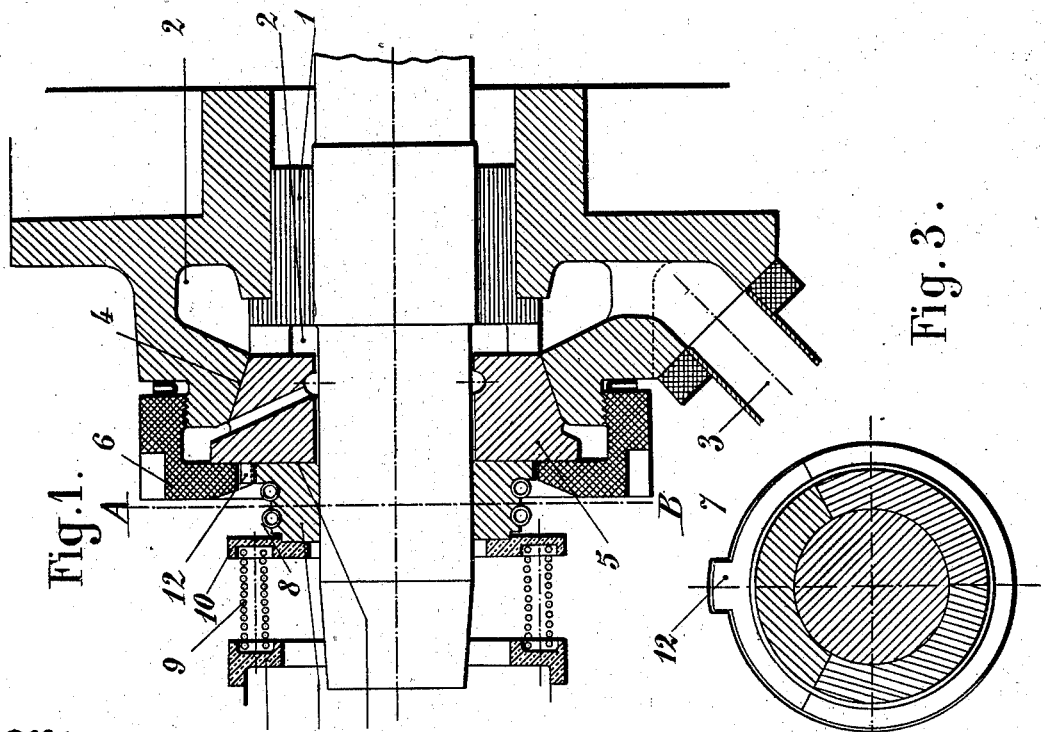

UNITED STATES PATENT OFFICE.

AUGUSTE CAMILLE EDMOND RATEAU AND HENRI AMÉDÉE EMILE HARLÉ, OF PARIS, FRANCE.

STUFFING-BOX FOR TURBINES.

SPECIFICATION forming part of Letters Patent No. 712,594, dated November 4, 1902.

Application filed August 12, 1902. Serial No. 119,396. (No model.)

*To all whom it may concern:*

Be it known that we, AUGUSTE CAMILLE EDMOND RATEAU and HENRI AMÉDÉE EMILE HARLÉ, citizens of the Republic of France, residing at Paris, France, have invented a new and useful Improvement in Stuffing-Boxes Suitable for Turbines, which improvement is fully set forth in the following specification.

In an application for patent filed August 1, 1901, by Auguste C. E. Rateau, one of the present applicants, and Gaston Sautter, under the Serial No. 70,438, a construction and arrangement of a system of direct-action multicellular helicoidal turbines is described. This system has for its object to lessen the leakage of steam, which is one of the greatest sources of loss in multiple-wheel steam-turbines, while at the same time the steam can expand at each successive fall of pressure. As the steam completely fills the space formed by the turbine-casing, it is of the greatest importance to prevent the steam which always leaks between the shaft and the steam-distributer diaphragms from drawing any lubricating-oil along with it. On the other hand, in a steam-turbine in which a moving wheel is rotated in a casing filled with steam the wheel not being in contact with the walls of the casing the moving parts of the turbine require no lubrication, with the exception of the shaft-bearings. It is for this purpose only necessary for the bearings of the shaft to be placed outside the turbine-casing. This arrangement entirely prevents the introduction of any lubricant into the interior of the casing, and consequently steam devoid of grease is employed. There is therefore no longer risk of seeing oil penetrate little by little into the condenser. The use of apparatus for removing grease from steam, which never give entirely satisfactory results, is thus avoided. When, however, the bearings of the turbine-shaft are placed outside the casing, a difficulty arises—viz., that of insuring the tightness of the casing at the places at which the shaft passes out. It is necessary, therefore, to provide at these places perfectly tight stuffing-boxes. The tightness of a partition submitted to two different pressures upon its two faces and traversed by a shaft rotating rapidly offers special difficulties. It is possible in the case of steam-turbines to employ metallic packing. Such packing if not sufficiently tightened up allows steam to escape. If it be sufficiently tightened to insure being completely steam-tight, it heats and finishes by wearing and even arresting the shaft, for it forms a fairly efficient brake. These disadvantages may be avoided by the use of a ring of fluid—that is to say, by placing around the shaft a bush which forms a circular partition and which allows room for a slight transverse movement of the shaft. The bush allows a ring of fluid to be formed around the shaft in the space reserved and the shaft can oscillate without heating. This principle has been utilized long since in centrifugal pumps in the form of a ring of water and in packing piston-rods in the form of a ring of steam. The escape of fluid thus arranged around the shaft may take place in one or other direction, according as the ring in question is put in communication with a suitable chosen point in the engine. The pressure may cause the escape of fluid from outside the bush in question into the engine, or, on the contrary, cause a flow of steam from the engine into the ring of fluid. If the pressure at the point chosen varies much, the escape of steam will follow the variations of pressure, and in certain cases—in a steam-turbine, for example—it might even give rise to the inlet of air. This phenomenon might be caused when one of the sides of the partition is submitted to atmospheric pressure.

According to our invention the arrangement is such that a constant pressure is automatically maintained in the ring of fluid. For this purpose the ring is permanently placed in communication with a reservoir or automatic regulator, which maintains, as will be described later, a constant and adjustable pressure. This pressure may, as near as possible be atmospheric pressure. The escape of steam then becomes capable of regulation, and this may be carried out by means of a ring in three pieces, analogous to that employed in steam-turbines for a single moving wheel.

Figure 1 shows an arrangement such as applied to steam-turbines having multiple wheels. Fig. 2 shows the regulator of the pressure of steam in the reservoir. Fig. 3 is a section on the line A B in Fig. 1. Fig. 4 illustrates diagrammatically the general arrangement applied to a steam-turbine.

1 is a bush forming a partition around the shaft, beyond which is the space submitted to a pressure which will be called "P."

2 is a circular chamber, which contains the ring of fluid and in which is an outlet. It is in communication with the reservoir for regulating the pressure, in which a pressure is maintained which we will call "P'," differing little from atmospheric pressure.

3 is the end of the outlet-pipe from the chamber 2.

4 is a flange.

5 is a conical cap formed in two pieces. The cap comes against the conical portion of the flange 4. It is pierced with a lubricating-hole, and a space is left around the shaft for the passage of the lubricant.

6 is a threaded nut, which screws upon a screw-thread on the end of the flange 4. The nut in its movement presses against the conical cap 5 and forces it to enter into its housing, thus pressing the two pieces composing it each against the other, and so forming a hermetic joint.

7 is a ring formed in three pieces, as shown in Fig. 3. The three pieces forming the ring are pressed one against the other by means of two circular springs 8. The ring is pressed against the conical cap 5 by means of helical springs 9, the ends of which compress a tightening-flange 10, while the other ends bear against a fixed piece 11. The ring 7, formed in three pieces, is provided with a projection 12, which engages with the nut 6, preventing it from turning with the shaft.

Fig. 2 shows the automatic regulator of the fluid maintained in the reservoir, which communicates with the ring of steam.

13 is a cylindrical piece.

14 is a piston of small diameter.

15 is a piston of larger diameter, both pistons being fixed to the same rod.

16 is the piston-rod.

17 is a membrane.

18 is a helical spring acting upon a lever actuated by the membrane 17.

19 is an annular space formed around the lower portion of the piston-rod 16.

20 is the inlet for fluid.

21 is the outlet for the fluid.

22 is an orifice situated at the upper portion of the cylinder.

Working of the apparatus: The general working of the apparatus is indicated in the diagrammatic view in Fig. 4. This figure shows a steam-turbine T, having an inlet X for steam at the high-pressure side and the outlet Y for steam passing to the condenser at the low-pressure end. 23 is the ring of fluid forming a stuffing-box at the end of the shaft which comes out of the high-pressure end. 27 is a similar ring placed at the low-pressure end. 24 is a pipe communicating between the ring of steam 23 and the reservoir 25, regulating the pressure. 26 is a similar pipe allowing the pressure-reservoir to communicate with the ring of steam 27. 28 is a pipe for allowing the orifice 20 of the regulator to communicate with the steam-inlet X. 29 is the pressure-regulator, details of which are shown in Fig. 2. 31 is a pipe leading to the outlet-orifice from the regulator (marked 21 on Fig. 2) to a point suitably chosen in the turbine. It is easy after this description to see how the apparatus works. The pressure-reservoir 25 is in communication, on the one hand, with the ring of steam 23 and, on the other hand, with the ring of steam 27. The steam which escapes from the ring 23 passes to the reservoir 25 through the pipe 24. From the reservoir 25 it passes to the ring 27, which allows it to pass into the interior of the turbine, but at the condenser side. The reservoir 25 is in permanent communication with the regulator through the pipe 30, which leads into the orifice 22. (Shown in Fig. 2.) If the pressure P' in the reservoir decreases, the membrane 17 will be submitted to a lower pressure, because the pressure inside the regulator-cylinder is by reason of the annular pipe 19 the same as far as the membrane as in the reservoir. The helical spring 18 of the regulator forces back the piston 14, covering the orifice 20. High-pressure steam then passes into the regulator through the pipe 28. The steam raises the pressure in the intermediate reservoir 25 and gives it its normal value. The excess passes through the pipe 31 through the orifice 21, Fig. 2, the excess passing out at a point suitably chosen into the turbine. If, on the contrary, the pressure is raised in the interior of the reservoir 25, the membrane 17 causes the piston 15 to fall and uncovers the orifice 21. The reservoir is then submitted to the pressure of the steam passing in through the pipe 31. It is evident that this arrangement of regulator might be worked by the aid of valves other than the slides formed by the pistons.

Having now particularly described and ascertained the nature of our said invention and in what manner the same is to be performed, we declare that what we claim is—

1. In a turbine of the character described, a stuffing-box comprising a bush surrounding the part to be stuffed, an annular chamber formed outside the bush and arranged to contain a ring of fluid under pressure, a regulating-reservoir filled with fluid under required pressure and communicating directly with the annular chamber of the stuffing-box, a regulating-valve having three openings, whereof one communicates with a high-pressure pipe entering the turbine, another communicates with a low-pressure pipe leading from an intermediate point of the turbine and the third communicates directly with the regulating-reservoir, said valve provided with a membrane arranged to open or close the high or low pressure pipes alternately to maintain the reservoir under required pressure.

2. In a turbine of the character described, a stuffing-box, comprising a bushing surrounding the part to be stuffed, a flange projecting beyond the bushing to form an annular chamber for the reception of a ring of fluid under pressure, an inlet for said fluid to said chamber, a cap formed of two pieces entering said flange and arranged to close the outer face of said chamber, a threaded nut arranged to hold said cap within the flange, a series of separable metallic rings, springs arranged to clamp said rings about the part to be stuffed, and means for pressing said rings inward under spring tension against said cap.

In testimony whereof we have signed this specification in the presence of two subscribing witnesses.

AUGUSTE CAMILLE EDMOND RATEAU.
HENRI AMÉDÉE EMILE HARLÉ.

Witnesses:
JEAN VAUCHER,
EDWARD P. MACLEAN.